United States Patent [19]

Brueton

[11] Patent Number: 5,148,979
[45] Date of Patent: Sep. 22, 1992

[54] SETUP-SETBACK THERMOSTAT HAVING A SIMPLE SETUP-SETBACK VISUAL INDICATOR

[75] Inventor: Stephen J. Brueton, Stouffville, Canada

[73] Assignee: Honeywell Limited-Honeywell Limitee, North York, Canada

[21] Appl. No.: 743,549

[22] Filed: Aug. 12, 1991

[51] Int. Cl.⁵ ............................................. G05D 23/00
[52] U.S. Cl. ........................................ 236/94; 236/47
[58] Field of Search .................. 236/47, 94; 165/11.1

[56] References Cited

U.S. PATENT DOCUMENTS 4,685,615  8/1987  Hart .................................... 236/94

FOREIGN PATENT DOCUMENTS 1141112  12/1962  Fed. Rep. of Germany ........ 236/47

Primary Examiner—William E. Wayner
Attorney, Agent, or Firm—Robert B. Leonard

[57] ABSTRACT

A thermostat having a simple to see and use setup-setback visual indicator. One temperature control is used to set temperature while a second temperature control is used to activate the setup or setback. The second temperature control is offset from the body of the thermostat in the setup or setback mode to provide simple visual indication of the setup or setback.

6 Claims, 3 Drawing Sheets

SETUP-SETBACK THERMOSTAT HAVING A SIMPLE SETUP-SETBACK VISUAL INDICATOR

BACKGROUND OF THE INVENTION

This invention relates generally to building temperature controls and more specifically to setback thermostats.

In homes with non-automatic setback thermostats, it is normal for the homeowner to set the temperature down at night and up again in the morning. this is done by altering the setpoint of the device. The repeatability of the actual temperature set depends upon the persons visual acuity and manual dexterity. In addition, no indication of the setback is readily apparent.

SUMMARY OF THE INVENTION

The present invention is a thermostat having a simple setback and setup indication. A slide for setting a desired temperature is formed within an assembly used for putting the thermostat into the setup or setback mode. A flange adjacent to the assembly and hidden by the asssembly when the thermostat is in a . normal operating mode, can be colored to contrast with the assembly to provide a visual indication of setup or setback when the assembly is moved.

In a first embodiment, two potentiometers are adjusted by the slide and assembly upon movement of the slide and assembly to adjust the temperature setpoint.

In a second embodiment, two ramps are placed between a temperature sensitive element and a switch. One ramp is continuous while the other ramp has at least two flat regions along one side. By arranging the ramps, the temperature sensitive element and the switch in a desired way, movement of the ramps affects the temperature at which the switch is actuated.

DETAILED DESCRIPTION OF THE PREFERRED EMBODIMENTS

Figure 1A:
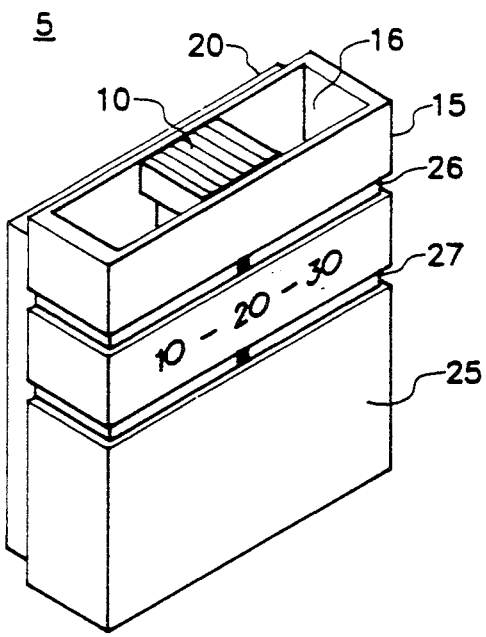
FIG. 1A is a front perspective view of the exterior of the inventive thermostat in a normal operating mode.

Referring now to FIG. 1A, thereshown is the exterior of thermostat 5 of the present invention. The thermostat includes a first temperature setting means 10, second temperature setting means 15, flange 20 and cover 25. The cover may include a temperature scale, setpoint indicator 26 and temperature indicator 27.

The thermostat is capable of turning on a heating or cooling system when the setpoint of the thermostat does not match the temperature sensed by the thermostat in a manner well known in the art. The setpoint is adjusted by moving first temperature setting means 10, which in this case is a slide, in the channel 16 formed in the second temperature setting means 15 until setpoint indicator 26 indicates a desired temperature. More on the operation of the thermostat will be described below.

As was stated before, at night or when the controlled space is to be unoccupied for a long period, it is desirable to reduce the energy used to maintain space temperature. This may be accomplished by lowering the setpoint when in a heating mode (setback) or raising the temperature when in a cooling mode (setup).

Figure 1B:
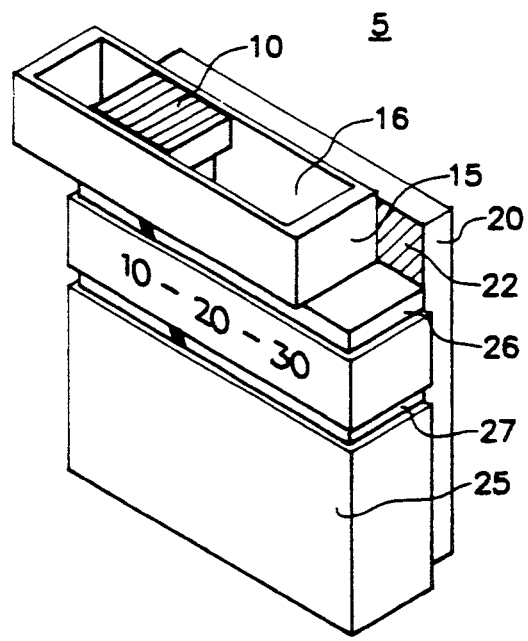
FIG. 1B is a perspective view of the inventive thermostat in a setback mode.
Figure 1C:
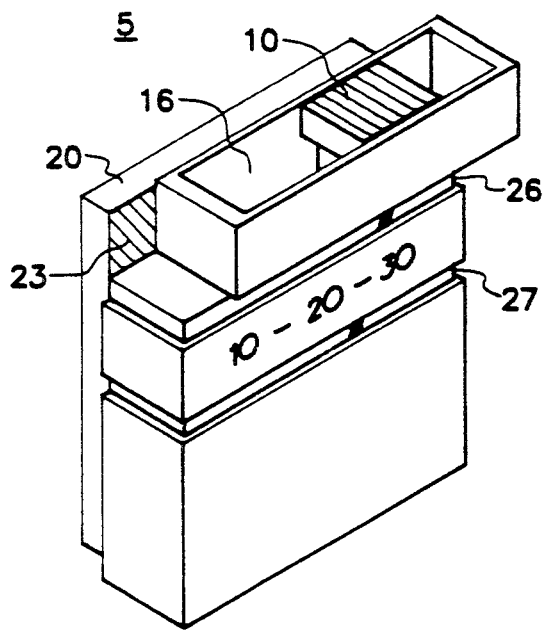
FIG. 1C is a perspective view of the inventive thermsotat in a setup mode.

The present invention provides a simple to make and simple to use setback or setup indication means as shown in FIGS. 1B and 1C. Second temperature setting means 15 is movable with respect to cover 25 and flange 20 to put the thermostat into either setback or setup mode. As an example, the position of second temperature setting means in FIG. 1B could be indicative of the thermostat being in setback mode. Then, FIG. 1C would be indicative of setup mode. It is obvious however, that these positions could also be reversed and still fall within the spirit of the invention. Flange 20 may be modified at regions 22 and 23 so that these regions when exposed due to movement of second temperature setting means 15 easily indicate whether the thermostat is in setback or setup mode. For example, region 22 could be colored blue to indicate setback while region 23 could be colored red to indicate setup.

While the exterior of the inventive thermostat 5 has been described, more details of the internal operation of the thermostat is provided with reference to FIGS. 2A through 3D.

Figure 2A:
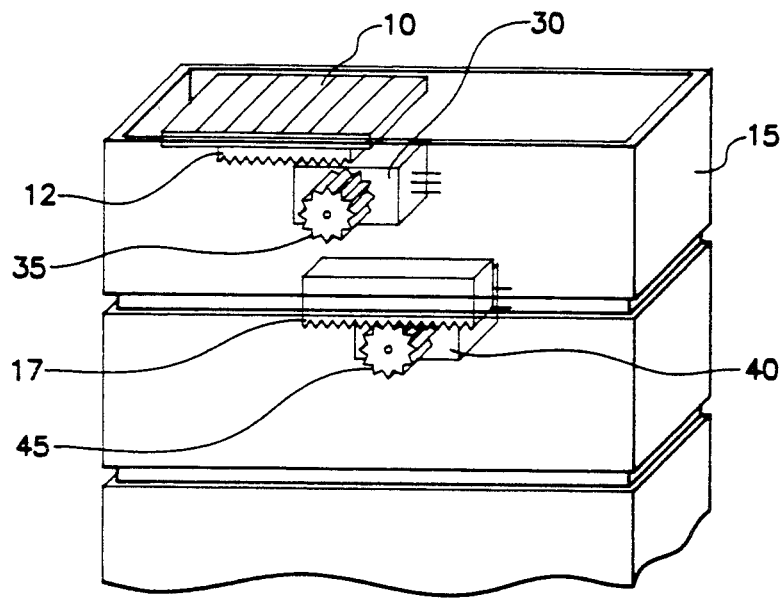
FIG. 2A is a partial internal view of the first and second temperature setting and adjusting means in an electronic embodiment of the inventive thermostat.
Figure 2B:
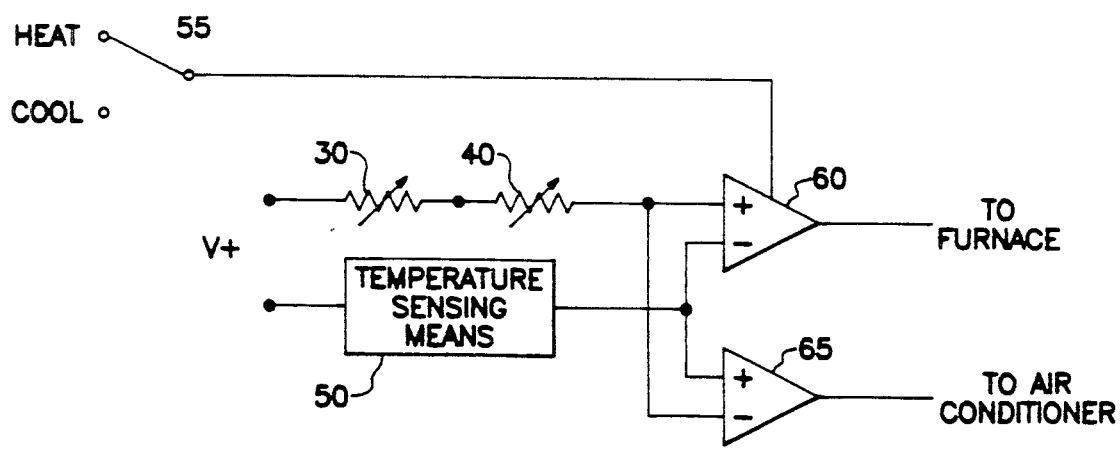
FIG. 2B is a block diagram of the electronic embodiment of the thermostat.

In FIGS. 2A and 2B, an electronic version of the inventive thermostat is shown. First temperature setting means 10, also known as a slide, moves in channel 16. Slide 10 contacts second temperature adjustment means 35, which in this case is a potentiometer. Movement of the slide causes a change in the resistance of the potentiometer. In this case, serrated edge 12 of slide 10 contacts gear wheel 35 to change the resistance. A linear potentiometer could be used equally as well with some modification to slide 10.

Second temperature setting means 15, also known as an assembly, is connected to second temperature adjustment means 40. The second temperature adjustment means may be a potentiometer. The assembly has a serrated portion 17 which contacts a gear wheel 45 to modify the resistance of the second potentiometer. Again, a linear potentiometer could be used in place of the shown potentiometer with some modifications to assembly 15.

In FIG. 2B, the electrical circuit of the electronic embodiment is shown. A temperature sensing means 50 produces a electrical signal proportional to a sensed temperature and is connected to comparators 60, 65. The two potentiometers are connected in series and then joined to the comparators. Switch 55 determines whether the thermostat is in a heating or cooling mode. The comparators produce a signal depending upon relative signal levels to operate either the furnace or the air conditioner.

Figure 3A:
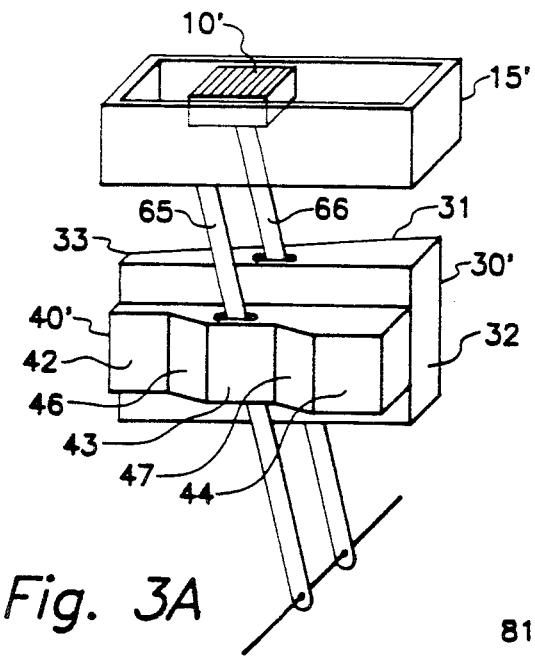
FIG. 3A is a partial internal view of the first and second temperature setting and adjusting means of a mechanical embodiment of the present invention.

Turning now to FIG. 3A, thereshown is a portion of a mechanical embodiment of the present invention in a front perspective view. First temperature setting means (slide) 10′ and second temperature setting means (assembly) 15′ are the same as in the first embodiment. The slide is connected via first rod 66 to first temperature adjustment means 30', also known as a first ramp. The first ramp 30' has a sloped region 31 extending from first end 32 to second end 33. Movement of slide 10 causes movement of first ramp 30.

Assembly 15' is connected via slide 65 to second temperature adjustment means 40', also known as second ramp. Second ramp 40' has three flat regions 42, 43 and 44 separated by sloped regions 46 and 47. Movement of assembly 15' causes movement of second ramp 40'. Note that the three level second ramp 40' is necessary if a setup and setback are both desired in the same thermostat. Otherwise, only two levels are necessary.

Figure 3B:
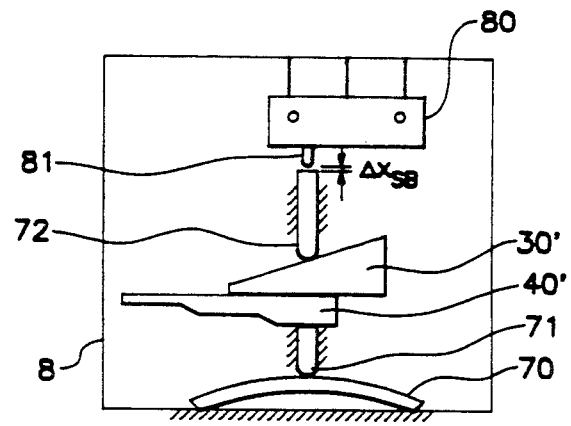
FIGS. 3B, 3C and 3D are top views of the mechanical embodiment excluding the temperature setting means.
Figure 3C:
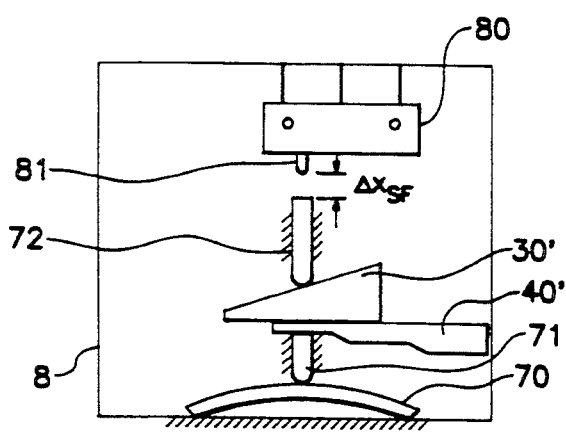
Figure 3D:
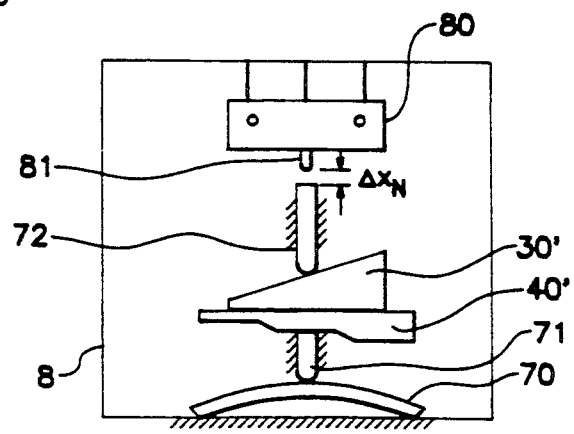

Looking now at FIGS. 3B, 3C and 3D, thereshown is a top view of the second embodiment without the first and second temperature setting means and connecting rods. Wall 8 contains all of the pieces of the thermostat. Temperature sensing means 70 is connected to wall 8 and expands as the temperature rises while contracting when the temperature falls. Temperature sensing means 70 may be a bimetal or a filled element and is connected to second ramp 40, by rod 71. Next, first ramp 30' is slidably connected to second ramp 40'. Lastly, rod 72 connects first ramp 30' to switch 80. Switch 80 is operated by moving actuator 81 axially.

In FIG. 3D, the thermostat is shown in normal operation. Note that second ramp 40' is positioned so that rod 71 rests on the middle level 43 of the second ramp. In FIG. 3B, the thermostat is in setback mode with the second ramp being positioned to be in contact with rod 71 at low level 42. Lastly, in FIG. 3C. second ramp 40' is positioned to be in a setup mode with the second ramp contacting rod 71 at high level 44.

The foregoing has been a description of a novel and non-obvious thermostat. The inventor does not intend to limit the invention to the foregoing description, but instead defines the limits of the invention through the claims appended hereto.

I claim:

1. A thermostat for controlling room temperature, comprising:
   first temperature setting means movable in a first plane for selecting a first desired temperature;
   second temperature setting means movable in a second plane between first and second extreme positions and a third intermediate position for modifying said desired temperature by a predetermined amount to create a second desired temperature when said second temperature setting means is in said second position;
   temperature adjustment means connected to said first and second temperature setting means; and
   temperature sensing means connected to said temperature adjustment means, said temperature sensing means producing a first signal if the room temperature is greater than said second desired temperature and a second signal otherwise; and
   a flange adjacent to said second temperature setting means, said flange being substantially out of sight when said second temperature setting means is in said third intermediate position and becomes more visible as said second temperature setting means is moved away from said third intermediate position, whereby a visual indication of the thermostat being in a setback mode is provided.

2. The thermostat of claim 1, wherein:
   said second temperature setting means has a first color; and
   said flange is of a second color different than said first color at a position visible when said second temperature setting means is at said first extreme position.

3. The thermostat of claim 2, wherein:
   said flange is of a third color different than said first and second colors at a position visible whens said second temperature setting means is at said second extreme position.

4. The thermostat of claim 2, wherein:
   said temperature adjustment means comprises:
      a first variable impedance connected to said first temperature setting means and electrically connected to said temperature sensing means, said first variable impedance varying in response to movement of said first temperature setting means;
      a second variable impedance connected to said second temperature setting means and electrically connected to said first variable impedance and said temperature sensing means, said second variable impedance varying in response to movement of said second temperature setting means; and
   said temperature sensing means adjusts said second desired temperature in response to changes in impedance in said first and second variable impedances.

5. The thermostat of claim 4, wherein:
   said first and second variable impedances are first and second potentiometers, said first potentiometer having a greater range of resistance than said second potentiometer.

6. The thermostat of claim 2, wherein:
   said temperature sensing means is a thermally expansive element which expands due to a temperature change in a first direction and contracts due to a temperature change in a second direction;
   said first temperature setting means is comprised of a continuous ramp;
   said second temperature setting means is comprised of a ramp having first and second ends and a flat region formed at said second end, said second temperature setting means being connected to said first temperature setting means;
   said temperature adjustment means is comprised of a rod connected to said first and second temperature adjustment means and said temperature sensing means; and
   said thermostat further comprises a pair of spaced electrical contacts, one of said contacts being movable and one of said contacts being fixed, said movable contact being connected to said temperature adjustment means and said temperature sensing element, said movable contact being moved by expansion and contraction of said temperature sensing element and by movement of said first and second temperature setting means.

* * * * *